United States Patent [19]
Nyzedatny

[11] Patent Number: 5,184,523
[45] Date of Patent: Feb. 9, 1993

[54] TRANSMISSION CONTROL EMPLOYING BI-DIRECTIONALLY GUIDED HANDLE, WITH LOCKING

[75] Inventor: Mark Nyzedatny, Temple City, Calif.

[73] Assignee: Adams Rite Manufacturing Company, City of Industry, Calif.

[21] Appl. No.: 853,418

[22] Filed: Mar. 18, 1992

[51] Int. Cl.⁵ .................... G05G 9/00; B60K 20/00
[52] U.S. Cl. ........................... 74/471 XY; 74/473 R; 74/477
[58] Field of Search .............. 74/471, 473 R, 475, 74/477

[56] References Cited

U.S. PATENT DOCUMENTS

| | | | |
|---|---|---|---|
| 2,821,275 | 1/1958 | Martin | 74/532 |
| 3,002,638 | 10/1961 | Needy | 414/687 |
| 3,082,638 | 3/1963 | Nilson | 74/473 R |
| 3,241,640 | 3/1966 | McCordic et al. | 74/475 |
| 3,361,234 | 1/1968 | Runyon | 192/4 A |
| 3,491,612 | 1/1970 | Adahan | 74/473 R |
| 3,519,111 | 7/1970 | Baldwin et al. | 192/4 A |
| 3,765,262 | 10/1973 | Mendenhall et al. | 74/473 R |
| 3,768,329 | 10/1973 | Comer, Jr. et al. | 74/477 |
| 3,795,157 | 3/1974 | Campbell et al. | 74/473 R X |
| 3,923,129 | 12/1975 | Rusch et al. | 192/4 B |
| 3,987,878 | 10/1976 | Hansen | 192/4 A |
| 4,004,665 | 1/1977 | Guhl et al. | 192/4 A |
| 4,054,181 | 10/1977 | Grosseau | 180/77 R |
| 4,137,792 | 2/1979 | Ceccano | 74/473 R |
| 4,138,903 | 2/1979 | Burdette et al. | 74/473 R |
| 4,206,602 | 6/1980 | Watson et al. | 74/471 XY X |
| 4,297,914 | 11/1981 | Klem et al. | 74/532 |
| 4,324,151 | 4/1982 | Rudy | 74/532 |
| 4,337,674 | 7/1982 | Lawrence | 74/475 |
| 4,358,965 | 11/1982 | Schroeder | 74/475 |
| 4,370,897 | 2/1983 | Carlo | 74/475 |
| 4,515,033 | 5/1985 | Carlo | 74/476 |
| 4,548,094 | 10/1985 | Huitema et al. | 74/526 |
| 4,625,842 | 12/1986 | King | 192/4 C |
| 4,709,793 | 12/1987 | Sakakibara et al. | 192/4 A |
| 4,830,156 | 5/1989 | Bellah et al. | 192/363 |
| 4,846,322 | 7/1989 | Swank | 129/4 A |
| 4,981,047 | 1/1991 | Denda et al. | 74/471 XY |
| 5,042,316 | 8/1991 | Gressett, Jr. | 74/473 R |

*Primary Examiner*—Dirk Wright
*Attorney, Agent, or Firm*—William W. Haefliger

[57] ABSTRACT

A control mechanism to control endwise displacement of first and second output member in response to variable positioning of an input member, comprising a frame; a first pivotal part carried by the frame to pivot about a first axis, the first output member connected to the first part; a second pivotal part carried by the first part to pivot about a second axis, the second output member connected to the second part; a control handle connected to the second pivotal part to pivot with the parts and to control pivoting thereof; guide structure on the frame to guide the pivoting of at least one of the handle and parts; and lock structure on the frame to releasably lock the one of the handle and parts in a lock position to which it is pivotally movable by the handle in response to guiding by the guide structure.

20 Claims, 4 Drawing Sheets

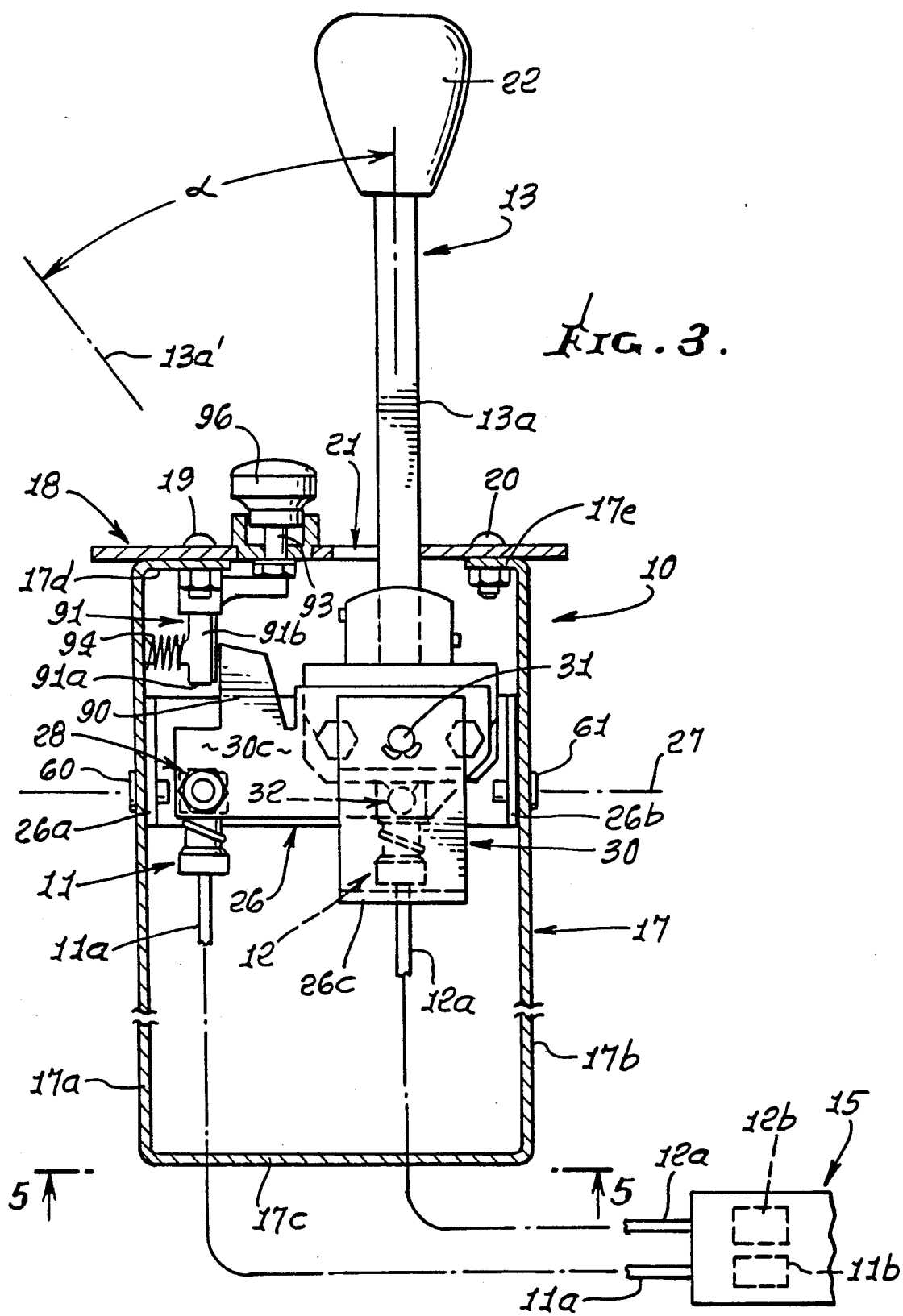

TRANSMISSION CONTROL EMPLOYING BI-DIRECTIONALLY GUIDED HANDLE, WITH LOCKING

BACKGROUND OF THE INVENTION

This invention relates generally to single input handle movement control of two output motions, as for operating mechanical push-pull cables connected to transmission elements (for example, valve spools). More specifically, it concerns an automatic locking of the input handle, when the handle is placed in a selected neutral position.

There is need for simple, effective manually actuated transmission controls in which inadvertent movement of the input handle into forward or reverse drive position is prevented. Further, there is need for reliable and improved mechanism, as described herein.

SUMMARY OF THE INVENTION

It is a major object of the invention to provide improved mechanism meeting the above need. Another major object is to provide such mechanism wherein the operator must use both of his hands to release the mechanism from a locked-up position, thereby preventing inadvertent release-displacement of the handle into forward or reverse drive positions.

Basically, the control mechanism of the invention controls endwise displacement of first and second output members in response to variable positioning of an input member, such as a handle, and includes:

a) a frame, b) a first pivotal part carried by the frame to pivot about a first axis, the first output member connected to the first part, c) a second pivotal part carried by the first part to pivot about a second axis, the second output member connected to the second part, d) a control handle connected to the second pivotal part to pivot with the parts and to control pivoting thereof, e) guide means on the frame to guide the pivoting of at least one of the handle and parts, f) and lock means on the frame to releasably lock the handle and/or parts in a lock position to which the handle is pivotally movable in response to guiding by the guide means.

As will be seen, the first output member is typically connected to the first part in offset relation to the first axis to be bodily displaced in response to pivoting of the first part about the first axis; and the second output member is connected to the second part in offset relation to the second axis to be bodily displaced in response to pivoting of the second part about the second axis. Such output members are, for example, pivotally mounted on the respective first and second parts.

It is another object to provide the lock means with a manually actuable element to release locking of the control handle enabling pivoting thereof out of the lock position. As will be seen, the lock means may advantageously include a dog on the second part to pivot therewith, a latch pivotally mounted on the frame to be cammed into a locking position in which it locks the pivoted dog against return pivoting, and a release operable to pivot the latch out of the locking position, allowing return pivoting of the dog and second part.

Yet another object includes providing the guide means with elongated guide surfaces extending in directions corresponding to handle pivoting about the first and second axes. Such guide surfaces are typically located on a guide plate through which the handle extends, the guide surfaces including primary and secondary longitudinally extending guide surfaces which are laterally spaced apart, and a laterally extending guide surface which extends between the primary and secondary guide surfaces, one of the primary and secondary guide surfaces extending toward the lock position. In addition, tertiary guide surfaces may be provided on the plate to guide the handle toward lock-up position The guide surfaces on the plate may border slots having E-shape, as will be seen.

Transmission elements may be connected with the two output members to be movable into the following positions:

i) first, second and third forward drive positions corresponding to handle movement into the first, second and third positions along a first of the two longitudinally extending slots, ii) first, second and third reverse drive positions corresponding to handle movement into the first, second and third positions along a second of the two longitudinal slots, iii) a neutral drive position corresponding to handle capability for movement into locked position.

These and other objects and advantages of the invention, as well as the details of an illustrative embodiment, will be more fully understood from the following specification and drawings, in which:

DRAWING DESCRIPTION

FIG. 3 is a side elevation taken on lines 3—3 of FIG. 4, showing control mechanism to control endwise displacement of first and second output members, in response to variable positioning of the control handle, as determined by the FIG. 1 guide;

DETAILED DESCRIPTION

Figure 1:
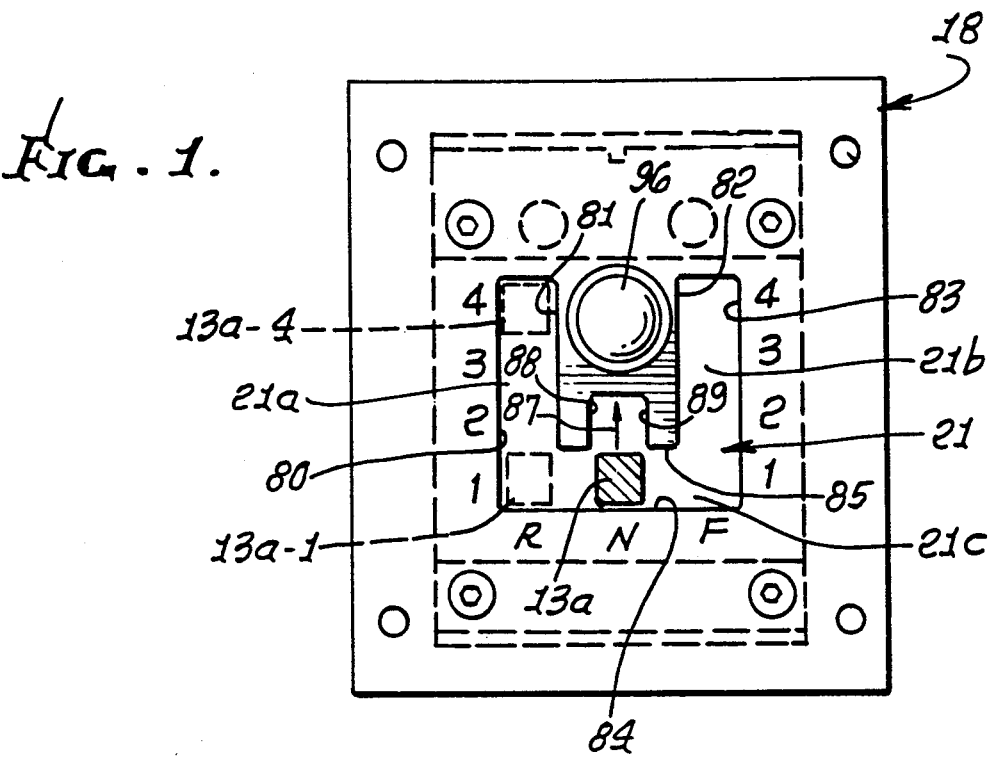
FIG. 1 is a plan view of a control handle position guide.
Figure 2A:
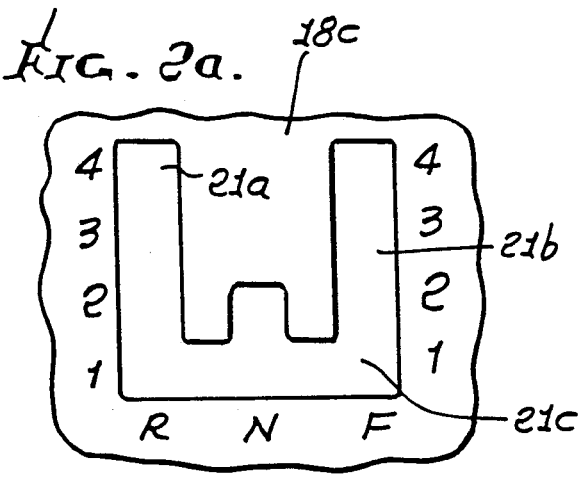
FIGS. 2a–2d are plan views showing different size or configuration guides for a control handle.
Figure 2B:
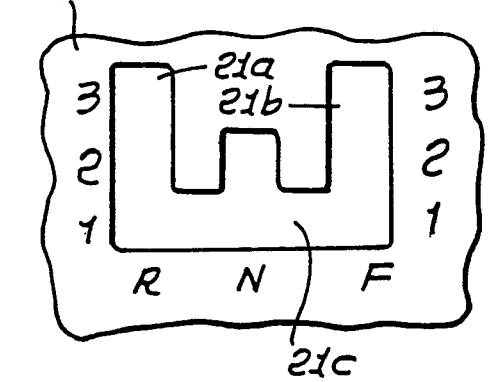
Figure 2C:
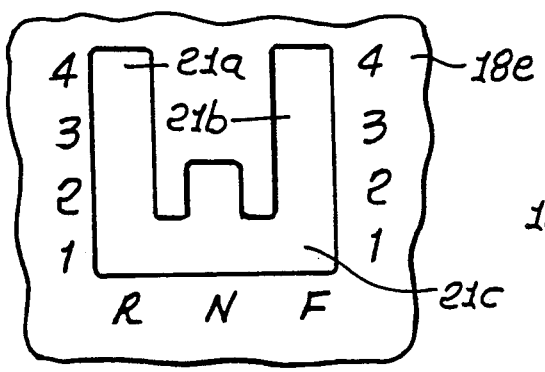
Figure 2D:
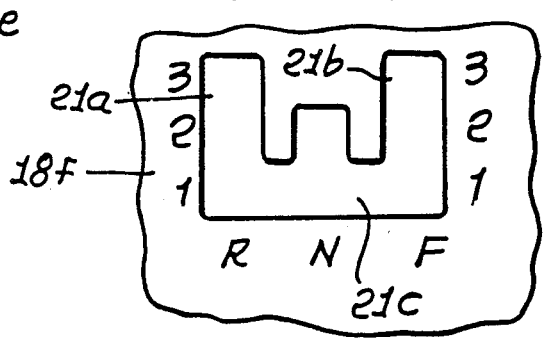

In the drawings, numeral 10 designates the control mechanism to control endwise displacement (up and down in FIG. 3) of first and second output members 11 and 12, in response to variable and guided positioning of an input member, such as control handle 13. Members 11 and 12 are typically connected to cables 11a and 12a, which extend to transmission mechanism 15. The latter may include two elements 11b and 12b which, when placed into different relative positions, transmit or enable motion with corresponding different speeds. Other type transmissions may be employed.

A frame 17 for the mechanism includes two upright plates 17a and 17b, and a bottom plate 17c. Attached to bent upper portions 17d and 17e of the frame is a handle guide means, such as guide plate 18. See fasteners 19 and 20. The handle 13 includes a handle shaft 13a projecting upwardly through an aperture 21 in the plate, having a guide configuration to be described. A knob 22 is attached to the top of the handle, to be manually grasped by the user's hand.

The control mechanism includes a first pivotal part 26 carried by the frame to pivot about a first axis 27, the first output member 11 being connected to part 26 in offset relation to axis 27, and preferably to swivel relative to part 26. See swivel connection 28 (for example a ball and socket) at the upper end of member 11, whereby member 11 hangs downwardly. The mechanism also includes a second pivotal part 30 carried by the first part 26 to pivot about a second axis 31. The second output member 12 is connected to second part 30 in offset relation to axis 31, and preferably to swivel relative to 30. See swivel connection 32 (for example ball and socket) at the upper end of member 12, whereby member 12 hangs downwardly, and in spaced relation to member 11.

Axes 27 and 31 are typically orthogonal, whereby a gimbal structure is defined by parts 26 and 30, pivoting as defined. Handle 13 has its lower end rigidly attached at 35 to second part 30, whereby the handle lower end is carried by the gimbal structure to pivot about both axes 27 and 31. See pivot angle α in FIG. 3, showing capability of the handle to pivot from upright shaft position 13a to a full forward position 13a', i.e., through an angle α in FIG. 3. This corresponds, for example, to handle shaft movement from R-1 position 13a-1 to R-4 position 13a-4 in "reverse" position guide slot 21a in FIG. 1; such handle movement acts to lower member 11 (while member 12 remains at one elevation), and return movement of the handle acts to elevate member 11. Four different handle positions are indicated at 1-2-3-4 as respects slot 21a. In similar manner, the handle may be moved, as described, between four positions 1-2-3-4 in "forward" position guide slot 21b, variably elevating and lowering member 11, while member 12 remains at one elevation.

Figure 4:
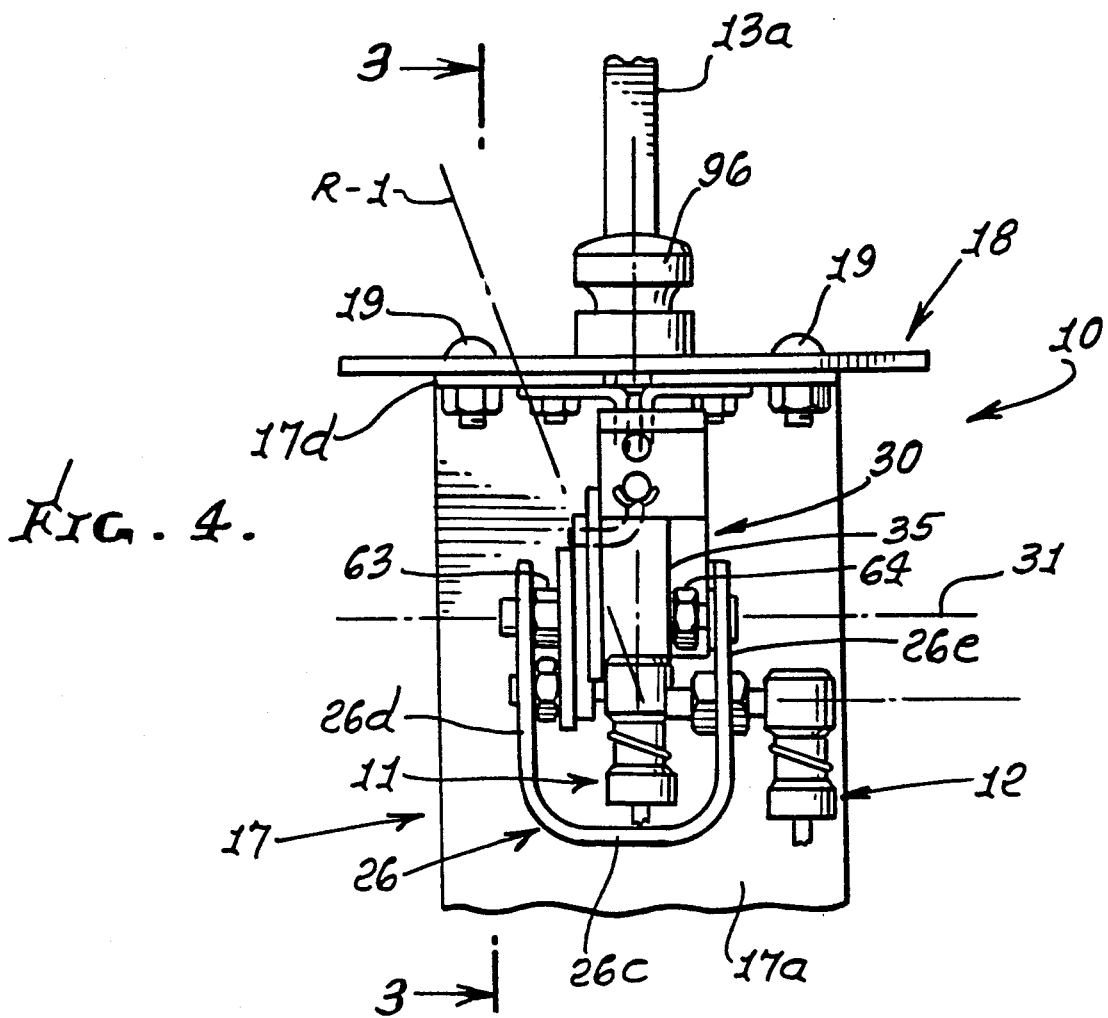
FIG. 4 is a side elevation of the FIG. 3 mechanism.

The handle shaft is shiftable between R-1 and F-1 positions in the slots 21a and 21b, by handle shaft lateral pivoting in guide slot 21c that intersects 21a and 21b, as shown. Such pivoting corresponds to pivoting of part 26 about axis 27. Thus, when the handle shaft is moved leftwardly laterally to position 13a-1 in FIG. 4 (slot position R-1), member 12 is raised; and when the handle shaft is moved to the right in FIG. 4 to position F-1, member 12 is lowered, member 11 retaining its elevation.

First part 26 may have sideward U-shape, with opposite ends 26a and 26b pivotably connected at 60 and 61 to frame plates 17a and 17b. First part 26 may also have downward U-shape at 26c to provide upright plates 26d and 26e for pivotally mounting the second part 30 therebetween. See pivotal connections 63 and 64.

Note that the guide means or plate 18 has edges adjacent the slots to guide the handle during its selected movement. See edges 80-85 in FIG. 1. Edges or surfaces 80-83 extend longitudinally, whereas edges 84 and 85 extend laterally. Tertiary longitudinal guide surfaces are seen at 88 and 89.

The invention also provides lock means on the frame to lock the gimbal in a position to which it is movable by the handle as the handle is guided by the guide means.

In FIG. 1, when the handle is moved to neutral position N-1 as shown, it is then able to be displaced forwardly in the direction of arrow 87 into the lock position, as at N-2.

Figure 3A:
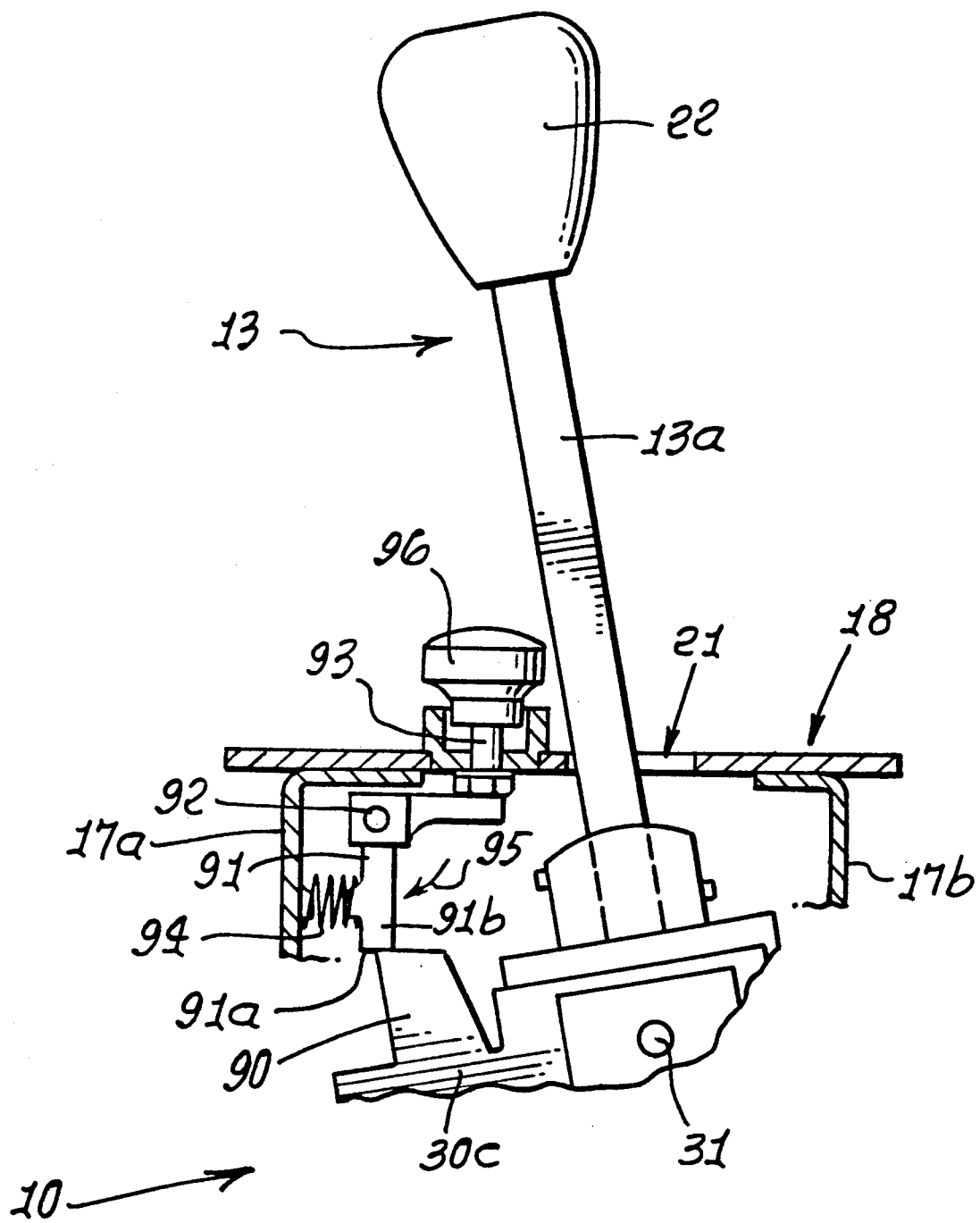
FIG. 3a is a fragmentary view showing lock-up of the control mechanism.

FIG. 3a shows the locked position of the handle, with the lock means releasably holding it in that position. The lock means includes a dog 90 on a plate portion 30c of the second part 30, to pivot therewith about axis 31. A latch 91 is pivotally mounted to the frame at 92 to be cammed by the dog into a dog locking position wherein the dog is locked against relative pivoting. Note the latch downwardly facing surface 91a engaging the top of the pivoted dog, to block clockwise pivoting in FIG. 3a. A release 93 is provided on the frame to pivot the latch against force exerted by spring 94, to pivot the latch in the direction of arrow 95, out of blocking relation with the dog 90. This allows return pivoting of the dog and second part 31, back to FIG. 3 position. The release is shown to include a manually graspable knob 96 to be pushed downwardly for releasably displacing the bell-crank shaped latch, as described (i.e., clockwise). Compression spring 94 is confined between plate 17a and the downwardly extending arm 91b of the latch.

Accordingly, to release the handle from locked up position N-2, both of the user's hands must be used, i.e., one hand to depress knob 96, and the other hand to force knob 22 clockwise in FIG. 3, pulling the handle shaft back to N-1 position. This prevents inadvertent displacement of the handle into forward or reverse gear drive positions, as respects transmission 15.

Figure 5:
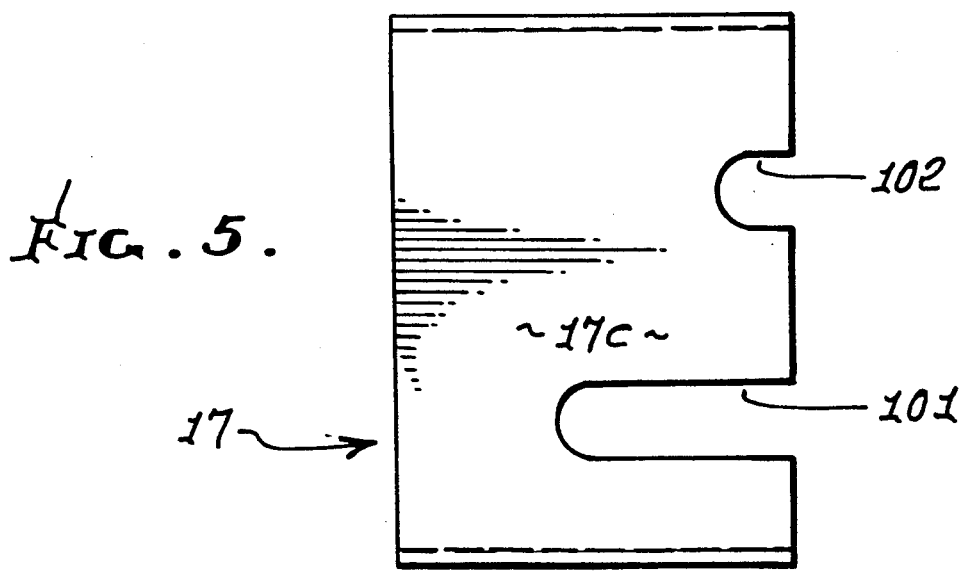
FIG. 5 is a bottom plan view taken on lines 5—5 of FIG. 3.

In FIG. 5, the bottom plate 17c is shown to have slots 101 and 102 to pass the cables 11a and 12a.

FIGS. 2a-2d shown various size and shape alternative E-shaped slots 21a-21c in alternative guide plates 18c-18f.

I claim:

1. In a control mechanism to control endwise displacement of first and second output member in response to variable positioning of an input member, the combination comprising:
    a) a frame,
    b) a first pivotal part carried by the frame to pivot about a first axis, the first output member connected to the first part,
    c) a second pivotal part carried by the first part to pivot about a second axis, the second output member connected to the second part,
    d) a control handle connected to the second pivotal part to pivot with said parts and to control pivoting thereof,
    e) guide means on the frame to guide said pivoting of at least one of said handle and parts,
    f) and lock means on the frame to releasably lock said one of the handle and parts in a lock position to which it is pivotally movable by the handle in response to guiding by said guide means.

2. The combination of claim 1 wherein the first output member is connected to the first part in offset relation to the first axis to be bodily displaced in response to pivoting of the first part about said first axis.

3. The combination of claim 2 wherein the second output member is connected to the second part in offset relation to the second axis to be bodily displaced in response to pivoting of the second part about the second axis.

4. The combination of claim 2 wherein the first output member is pivotally connected to the first part.

5. The combination of claim 3 wherein the second output member is pivotally connected to the second part.

6. The combination of claim 1 wherein said first and second axes are orthogonal.

7. The combination of claim 1 wherein said lock means includes a manually actuable element to release locking of the control handle enabling pivoting thereof out of said lock position.

8. The combination of claim 1 wherein said guide means has elongated guide surfaces extending in directions corresponding to handle pivoting about said first and second axes.

9. The combination of claim 8 wherein said guide means includes a plate carrying said elongated guide surfaces.

10. The combination of claim 8 wherein said guide surfaces include primary and secondary longitudinally extending guide surfaces which are laterally spaced apart, and a laterally extending guide surface which extends between said primary and secondary guide surfaces, one of said primary and secondary guide surfaces extending toward said lock positions.

11. The combination of claim 8 wherein said guide surfaces include
 i) primary, secondary and tertiary guide surfaces which extend longitudinally and are laterally spaced apart,
 ii) a laterally extending guide surface which extends between said primary, secondary and tertiary guide surfaces,
 iii) one of said primary, secondary and tertiary guide surfaces extending toward said lock position.

12. The combination of claim 11 wherein said guide means includes a plate carrying said guide surfaces.

13. The combination of claim 12 wherein said guide surfaces form an aperture having E-shaped configuration, the handle projecting through said aperture.

14. The combination of claim 13 wherein said aperture has three handle guide slots extending longitudinally, and one handle guide slot extending laterally, and intersecting said three slots.

15. The combination of claim 13 wherein said lock position corresponds to a handle position at the end of one of said three longitudinally extending slots.

16. The combination of claim 15 wherein the handle has first, second and third control positions into which it is movable along each of the two remaining longitudinally extending slots.

17. The combination of claim 16 wherein the handle has another position into which it is movable at the intersection of said lateral slot and said one slot.

18. The combination of claim 17 including transmission elements movable into the following positions:
 i) first, second and third forward drive positions corresponding to handle movement into said first, second and third positions along a first of said two remaining slots,
 ii) first, second and third reverse drive positions corresponding to handle movement into said first, second and third positions along a second of said two remaining slots,
 iii) a neutral drive position corresponding to handle positioning for movement into said lock position.

19. The combination of claim 1 wherein said lock means includes a dog on the second part to pivot therewith, a latch pivotally mounted on the frame to be cammed into a locking position in which it locks the pivoted dog against return pivoting, and a release operable to pivot the latch out of said locking position, allowing return pivoting of the dog and second part.

20. The combination of claim 19 including a spring on the frame yieldably urging the latch toward said locking position thereof.

* * * * *